United States Patent
Littlefield et al.

(10) Patent No.: US 10,094,427 B2
(45) Date of Patent: Oct. 9, 2018

(54) BALL CAM ACTUATED DOG CLUTCH

(71) Applicant: GM Global Technology Operations LLC, Detroit, MI (US)

(72) Inventors: Joseph Ralph Littlefield, Sterling Heights, MI (US); Pete R. Garcia, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 467 days.

(21) Appl. No.: 14/918,160

(22) Filed: Oct. 20, 2015

(65) Prior Publication Data

US 2017/0108052 A1     Apr. 20, 2017

(51) Int. Cl.
   *F16D 11/14*    (2006.01)
   *F16D 28/00*    (2006.01)
   *F16D 23/12*    (2006.01)

(52) U.S. Cl.
   CPC ............. *F16D 11/14* (2013.01); *F16D 28/00* (2013.01); *F16D 2023/123* (2013.01)

(58) Field of Classification Search
   CPC .... F16D 11/00–11/16; F16D 2023/123; F16D 2011/004
   See application file for complete search history.

(56) References Cited

U.S. PATENT DOCUMENTS

| | | | | |
|---|---|---|---|---|
| 2003/0094343 | A1* | 5/2003 | Showalter | F16D 25/02 192/35 |
| 2015/0171702 | A1* | 6/2015 | Matsuda | F16D 23/14 310/68 B |
| 2015/0247535 | A1* | 9/2015 | Sunada | F16D 41/088 192/66.1 |
| 2016/0097430 | A1* | 4/2016 | Imafuku | F16D 11/04 192/18 B |

FOREIGN PATENT DOCUMENTS

| CN | 1863690 A | 11/2006 |
|---|---|---|
| CN | 204153124 U | 2/2015 |

OTHER PUBLICATIONS

"Magna Steyr DD295 Transfer Box Teardown", RangeRovers.net Forum, Jul. 8, 2012, p. 1, post 10, RangeRovers.net http://www.rangerovers.net/forum/6-range-rover-mark-iii-l322/41233-magna-steyr-dd295-transfer-box-teardown-print.html.

\* cited by examiner

*Primary Examiner* — Ramya P Burgess
*Assistant Examiner* — Lillian T Nguyen (57) ABSTRACT

A ball cam actuated dog clutch assembly for a motor vehicle transmission includes a clutch sleeve having a plurality of gear teeth positioned at a first end and multiple ball bearings disposed at a second end. A clutch hub having multiple helical grooves is created in an outer facing wall. Each of the helical grooves receives a portion of one of the ball bearings. An actuator member acts to rotate the clutch hub. Rotation of the clutch hub causes axial translation of the clutch sleeve in a selected one of a first direction or an opposite second direction by translation of the ball bearings within the helical grooves.

18 Claims, 5 Drawing Sheets

BALL CAM ACTUATED DOG CLUTCH

FIELD

The present disclosure relates to a clutch assembly having a ball cam actuator.

BACKGROUND

The statements in this section merely provide background information related to the present disclosure and may or may not constitute prior art.

Traditional automatic transmissions use friction clutches in the form of either band clutches or multi-plate friction clutches. Friction clutches work by pressing two plates together. Friction between clutch elements allows the transfer of energy by allowing one plate to spin faster than the other or to slip. Automatic transmissions use friction clutches so that changing gear doesn't require engine power to drop. While changing gear, an automatic transmission can disconnect one clutch as it engages another. When ambient temperature drops below zero, however, and particularly at temperatures approaching −40° F. the hydraulic fluid pressure required to actuate friction clutches requires increased pump capacity, which may not be available in smaller engine and vehicle designs.

Dog clutches can be used in place of friction clutches and are commonly used in manual transmissions. Dog clutches are interference in lieu of slip clutches. Power is transmitted by a tooth of one side pressing on a tooth of the other side. Dog clutches cannot slip therefore they are either engaged or disengaged. Dog clutches suffer little parasitic loss and are simple and compact. Synchronizer dog clutches commonly employed in manual transmissions synchronize the speed of two components prior to engagement of those two components. Known synchronizers include a conical sleeve integrally connected to a blocker or dog ring. The sleeve has a set of teeth and is rotationally fixed to a first component and is longitudinally translatable along an axis of rotation to engage a set of teeth located on a second component. Longitudinal movement of the sleeve toward the direction of the second component initially causes a frusto-conical surface of the blocker ring to engage a matching frusto-conical surface on the second component prior to engagement of the teeth. Engagement of these two surfaces is a clutching action which causes the second component to be speed synchronized with the blocker ring and sleeve and thus the first component.

Known dog clutch synchronizers and their conical sleeves and one-way ball bearing clutches are limited in that they only provide engagement in one direction. In an application such as engagement of a final drive planetary gear set with a differential, known dog rings do not provide the necessary structure to allow functioning under load in opposite directions of displacement.

SUMMARY

According to several aspects, a ball cam actuated dog clutch assembly for a motor vehicle includes a clutch sleeve having multiple ball bearings retained by the clutch sleeve. A clutch hub has multiple helical grooves created in an outer facing wall. The clutch hub is positioned partially within the clutch sleeve having each of the helical grooves receiving a portion of one of the ball bearings. Rotation of the clutch hub causes axial translation of the clutch sleeve in a selected one of a first direction or an opposite second direction by translation of the ball bearings within the helical grooves.

According to further aspects, the clutch sleeve includes a plurality of gear teeth positioned at a first end aligned for meshed engagement with gear teeth of a drive assembly.

According to further aspects, the clutch sleeve includes the multiple ball bearings disposed at a second end.

According to further aspects, the clutch assembly further includes a bushing sleeve having a spline.

According to further aspects, the clutch sleeve further includes a splined face which is slidably connected with the spline of the bushing sleeve, wherein the clutch sleeve is axially slidable in each of the first direction and the second direction along the spline.

According to further aspects, a clip member is located at a free end of the spline acting to provide a positive stop for the clutch sleeve.

According to further aspects, a biasing member is positioned in contact with each of an end face of the clutch sleeve and a contact face of the bushing sleeve, the biasing member normally biasing the clutch sleeve in the first direction.

According to further aspects, the clutch hub and the clutch sleeve are coaxially aligned on a longitudinal axis, the rotation of the clutch hub defining an axial rotation with respect to the longitudinal axis and the translation of the clutch sleeve in either of the first or the second directions being parallel to the longitudinal axis.

According to further aspects, in an open position of the clutch assembly, each of the ball bearings directly contacts a groove end face of the helical grooves formed in a first end of the clutch hub.

According to further aspects, a length of each of the helical grooves is predetermined and defines a total axial displacement in each of the first direction and the opposite second direction of the clutch sleeve resulting from axial rotation of the clutch hub.

According to further aspects, the clutch sleeve includes a circumferential slot created in an inner facing wall proximate to an end of the clutch sleeve, the ball bearings positioned partially within the slot and individually retained and spaced by a cage assembly.

According to further aspects, the slot is positioned proximate to an end face of the end, providing clearance between an inner wall end face and an opposite end of the clutch hub, allowing free sliding motion of the clutch hub within the clutch sleeve.

According to further aspects, the helical grooves are each created in an outward facing cylindrical wall of the clutch hub; and each of the ball bearings occupy only a partial depth of the helical grooves, with approximately 50% or more of the ball bearings extending out of the helical grooves.

According to further aspects, each helical groove starts at a first end partially extending through a first end face of the clutch hub, and extends to a groove end face positioned approximately 50% of a distance between the first end face and an opposite second end face of the clutch hub.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
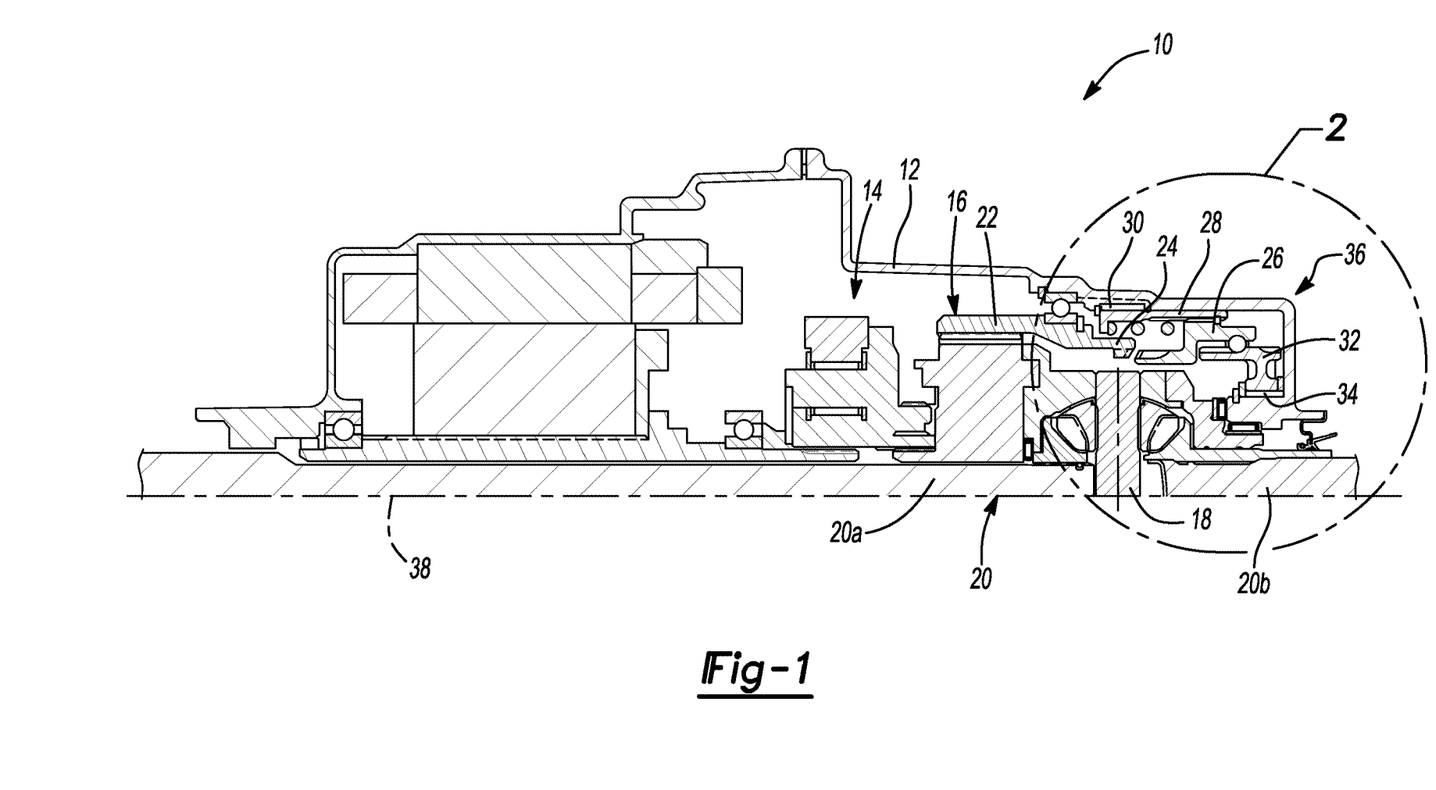
FIG. 1 is a cross sectional front elevational view of a transmission having a ball cam actuated dog clutch according to the principles of the present invention.

With reference to FIG. 1, a drive unit or transmission is illustrated and generally designated by reference number 10. The transmission 10 is preferably an automatic transmission of a motor vehicle (not shown). The transmission 10 includes a transmission housing or case 12, which can be a casting using a metal such as aluminum. A torque of the vehicle engine is transferred through a series of planetary gear sets 14 to provide multiple transmission speeds. A final drive unit 16 is meshed to the planetary gear sets 14 which is rotatably coupled to a differential 18. The differential 18 rotates an axle assembly 20 defined by a first axle half 20a and a second axle half 20b.

Figure 4:
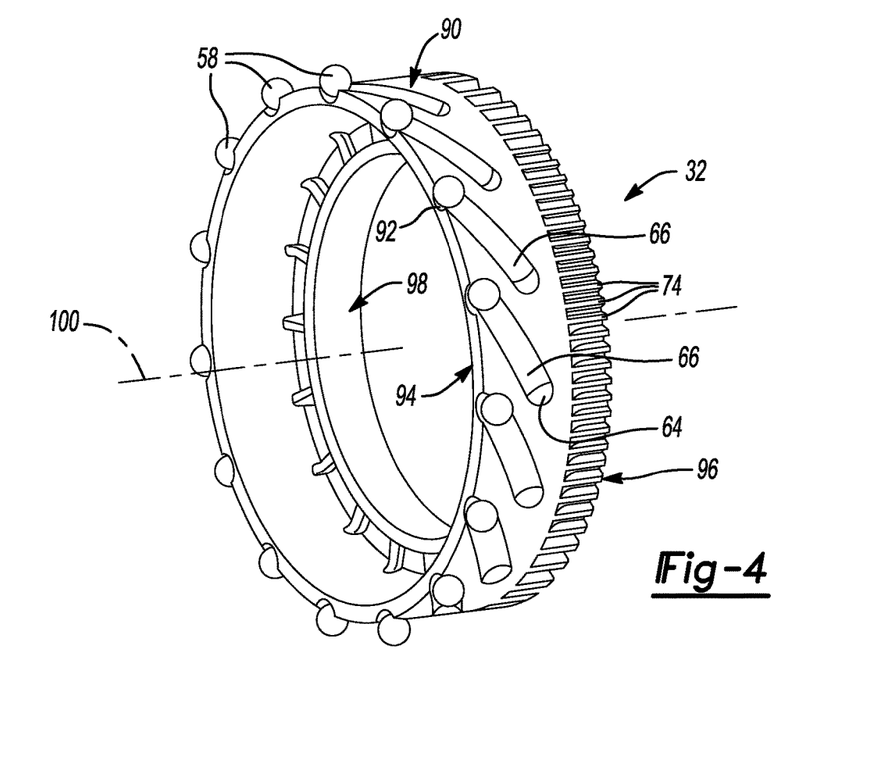
FIG. 4 is a front left perspective view of a clutch hub for the ball cam actuated dog clutch of FIG. 1.
Figure 5:
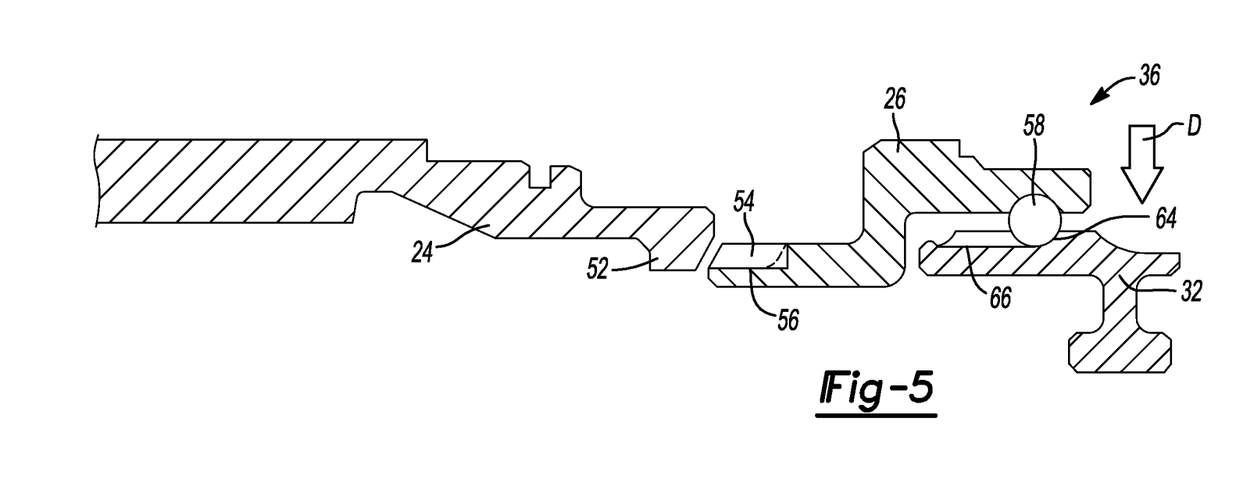
FIG. 5 is a cross sectional front elevational view of an open position of the clutch assembly of FIG. 1.
Figure 6:
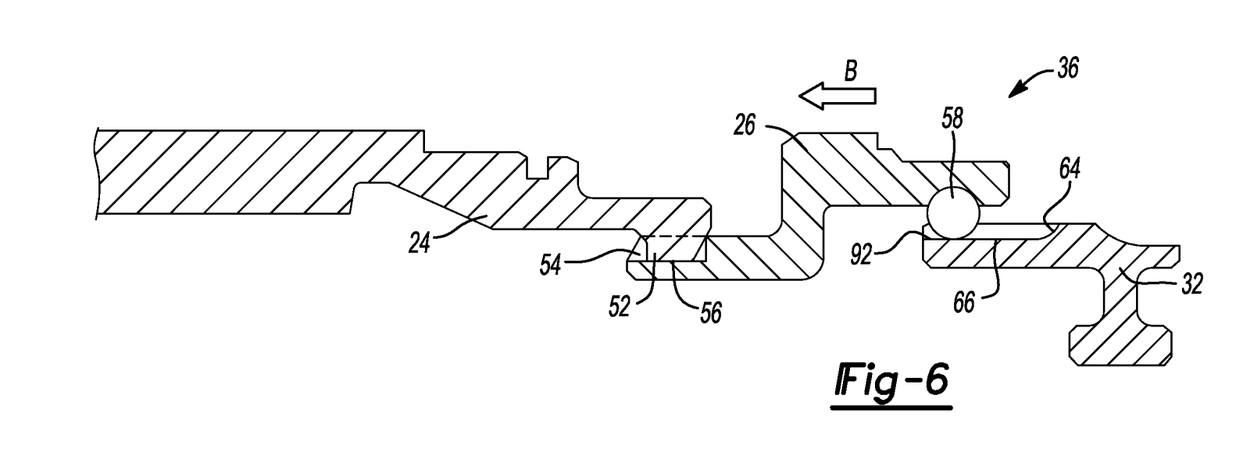
FIG. 6 is a cross sectional front elevational view of a closed position of the clutch assembly of FIG. 1.
Figure 7:
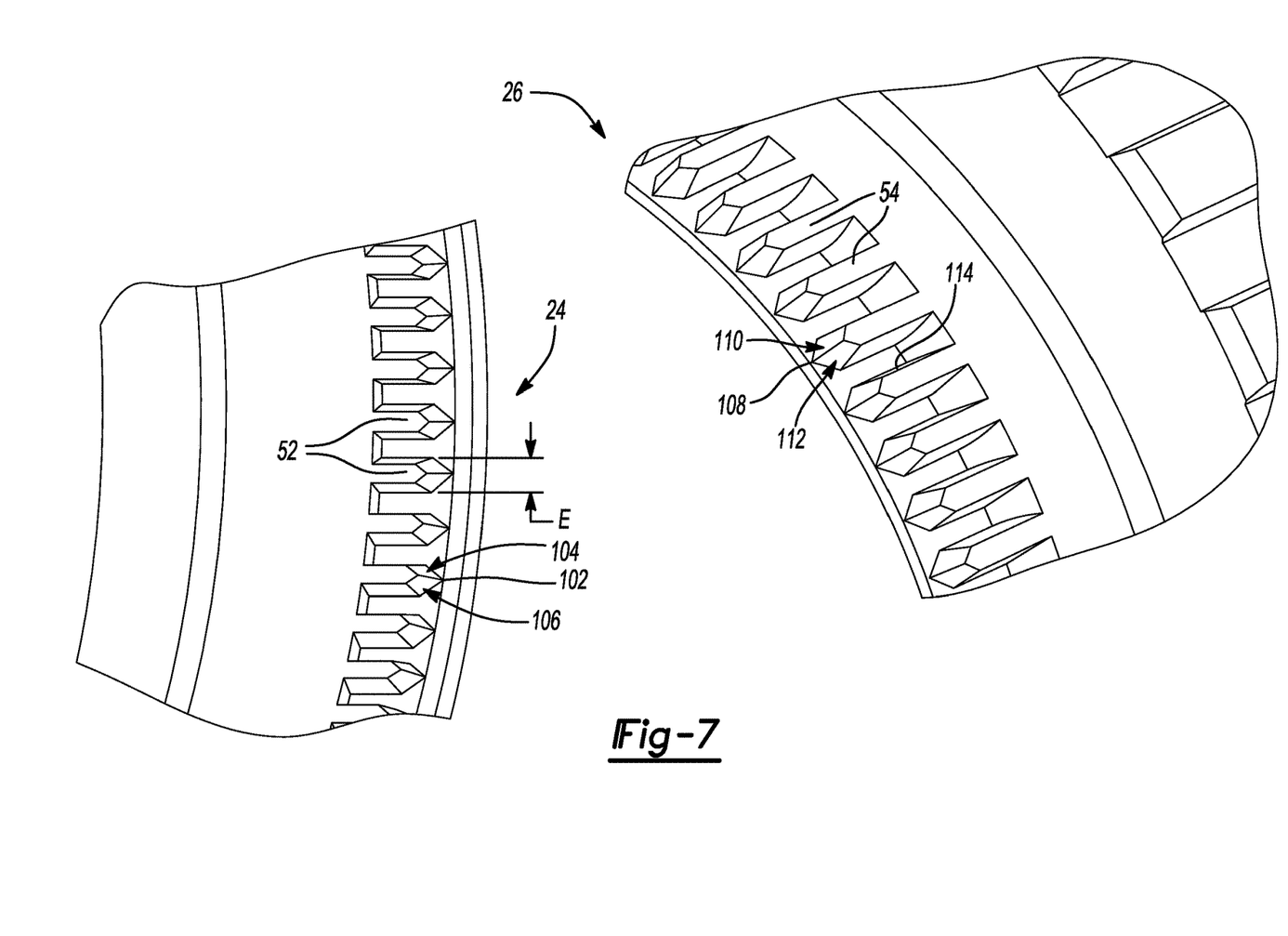
FIG. 7 are perspective views of meshing gear designs for the clutch assembly of FIG. 1.

According to several aspects, the final drive unit 16 defines a planetary gear set having a ring gear 22. A ring gear extension member 24 is integrally connected to and axially extends from the ring gear 22. Gear teeth of the ring gear extension member 24 can be meshed with gear teeth of a clutch sleeve 26 defining a clutch assembly closed position, which will be described in greater detail in reference to FIGS. 5-7. The clutch sleeve 26 is slidably connected to an axial extending bushing sleeve 28 which will be described in greater detail in reference to FIG. 2. The clutch sleeve 26 is connected to the case 12 by a spline connection 30. The clutch sleeve 26 is also coupled to a clutch hub 32 which will be described in greater detail in reference to FIGS. 2 and 4. The clutch hub 32 is rotatably supported to internal structure of the case 12 by a bushing 34. The components including the clutch sleeve 26, the bushing sleeve 28, and the clutch hub 32 together define a ball cam actuated dog clutch assembly 36 of the present disclosure. The planetary gear sets 14, the final drive unit 16, the differential 18, the axle assembly 20, and the clutch assembly 36 are all axially rotatably disposed with respect to a longitudinal axis 38.

Referring to FIG. 2 and again to FIG. 1, the clutch sleeve 26 of the clutch assembly 36 further includes a splined face 40 which is slidably connected with a spline 42 provided with the bushing sleeve 28. According to several aspects, the bushing sleeve 28 is provided of a material such as steel to prevent galling during sliding motion of the clutch sleeve 26, with the bushing sleeve 28 connected between the clutch sleeve 26 and the case 12, which therefore avoids sliding friction of the clutch sleeve 26 against the aluminum material of the case 12. The clutch sleeve 26 is axially slidable in each of a first direction "A" and an opposite second direction "B" along the spline 42. A clip member 44 can be provided at a free end of the spline 42 to provide a positive stop for sliding travel of the clutch sleeve 26. A biasing member 46 such as a coiled compression spring is positioned in contact with each of an end face 48 of the clutch sleeve 26 and a contact face 50 of the bushing sleeve 28. A biasing force of the biasing member 46 normally biases the clutch sleeve 26 in the direction "A". The clutch assembly 36 is shown in an open position wherein gear teeth 52 formed at a free end of the ring gear extension member 24 are disengaged from gear teeth 54 formed at a first end 56 of the clutch sleeve 26. The open position is normally maintained by the biasing force of the biasing member 46.

Figure 2:
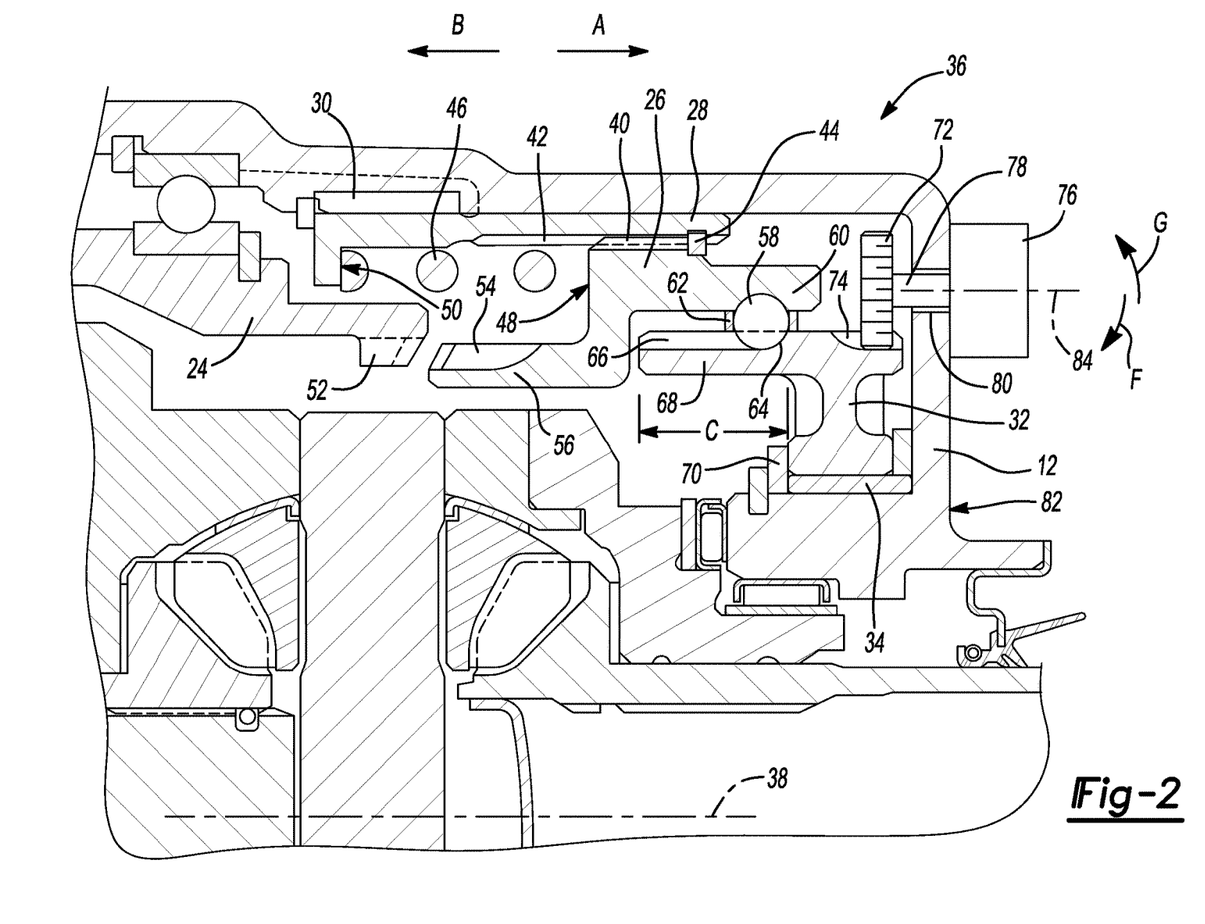
FIG. 2 is a cross sectional view taken at section 2 of FIG. 1.

To mechanically couple the clutch sleeve 26 to the clutch hub 32, the clutch sleeve 26 further includes a plurality of ball bearings 58 (only one of which is visible in this view), which are retained at a second end 60 of the clutch sleeve. A cage assembly 62 is provided which individual retains the ball bearings 58 at the second end 60. In the open position shown for the clutch assembly 36, each of the ball bearings 58 directly contacts a groove end face 64 of a plurality of helically curved or helical grooves 66 (only one of which is visible in this view) located at a first end 68 of the clutch hub 32. The ball bearings 58 can rotate and/or slidably displace within the helical grooves 66 when not in direct contact with the groove end face 64. The clutch sleeve 26 is axially displaced as the ball bearings 58 displace within the helical grooves 66. A length "C" of each of the helical grooves 66 is predetermined to establish a total axial displacement in the direction "A" and the opposite direction "B" of the clutch sleeve 26 which results from axial rotation of the clutch hub 32. As previously noted, the clutch hub 32 is rotatably supported by the bushing 34, and is also prevented from being axially displaced in either the direction "A" or the opposite direction "B" by a clip 70.

Axial rotation of the clutch hub 32 results from meshed rotation of a gear 72 which according to several aspects is a spur gear whose teeth mesh with gear teeth 74 of the clutch hub 32. The gear 72 is rotated by an actuator member which according to several aspects defines an actuator motor 76 connected by a motor shaft 78 to the gear 72. The motor shaft 78 can extend through a shaft bore 80 created in an end wall 82 of the case 12, which also supports the actuator motor 76. A seal or multiple seals, not shown, can be positioned in the shaft bore 80 to rotationally seal the motor shaft 78. According to several aspects, the actuator motor 76 is provided as a DC brushless motor, however other motor designs can also be used within the scope of the present disclosure. According to further aspects, the actuator motor 76 may be sealed and positioned within the case 12, proximate to an inside facing surface of the end wall 82. According to still further aspects, the actuator motor 76 is selectively operable to rotate in opposite rotational directions such that the clutch hub 32 can be rotated in either of opposite rotational directions. This permits the clutch sleeve 26 to be axially displaced in either the direction "A" or the opposite direction "B" to engage or disengage the ring gear extension member 24 even under torsional load. Operation of the actuator motor 76 can be controlled by a transmission control system (not shown) also used to control operation of other transmission control functions.

When the actuator motor 76 is supported off the end wall 82 a longitudinal and rotational axis 84 of the motor shaft 78 is oriented parallel to and offset from the longitudinal axis 38, to allow connection to the clutch hub 32 through the spur gear 72. From the open position of the clutch assembly 36 shown, the actuator motor 76 is energized to rotate the clutch hub 32 and to thereby axially displace the clutch sleeve 26 in the direction "B" until the gear teeth 54 of the clutch sleeve 26 mesh with the gear teeth 52 of the ring gear extension member 24. This meshed engagement defines a clutch closed position shown and described in greater detail in reference to FIG. 6. The actuator motor 76 remains energized to hold the clutch assembly 36 in the closed position against the biasing force of the biasing member 46. The actuation time of the actuator motor 76 required to fully axially displace the clutch sleeve 26 between the open and closed or between the closed and open positions is application specific and will result from a balance between the geometry of the helical grooves 66 and the actuator motor 76 size/rating. It is anticipated that actuation time will vary between approximately 100 ms to approximately 300ms.

Because the ball bearings 58 are retained in an axially fixed relationship to the clutch sleeve 26 and are displaced within the helical grooves 66 formed in the clutch hub 32, axial rotation of the clutch hub 32 with the clutch hub 32 being fixed against displacement in a direction of the longitudinal axis 38 converts the rotational force of the clutch hub 32 to a force having an axial component (parallel to the longitudinal axis 38) acting against the ball bearings 66. Because the ball bearings 58 are in direct contact with the walls of the helical grooves 66 the ball bearings 66 are forced to displace within the helical grooves 66, thereby axially displacing the clutch sleeve 26. The biasing member 46 and the helical shape of the helical grooves 66 allow the clutch assembly 36 to open automatically using only the applied force of the biasing member 46 after the clutch assembly 36 is unloaded (e.g., with the vehicle in a park position) and in the event of a failed actuator motor 76.

Referring to FIG. 3 and again to FIGS. 1 through 2, the clutch sleeve 26 includes a circumferential groove or slot 86 created in an inner facing wall of the second end 60. The ball bearings 58 are positioned partially within the slot 86 and are individually retained and spaced by the cage assembly 62 as previously noted. The slot 86 is positioned proximate to an end face 88 of the second end 60, providing clearance between an inner wall end face 89 and the first end 68 of the clutch hub 32, which thereby allows sliding motion as axial displacement of the clutch hub 32 within the clutch sleeve 26.

Figure 3:
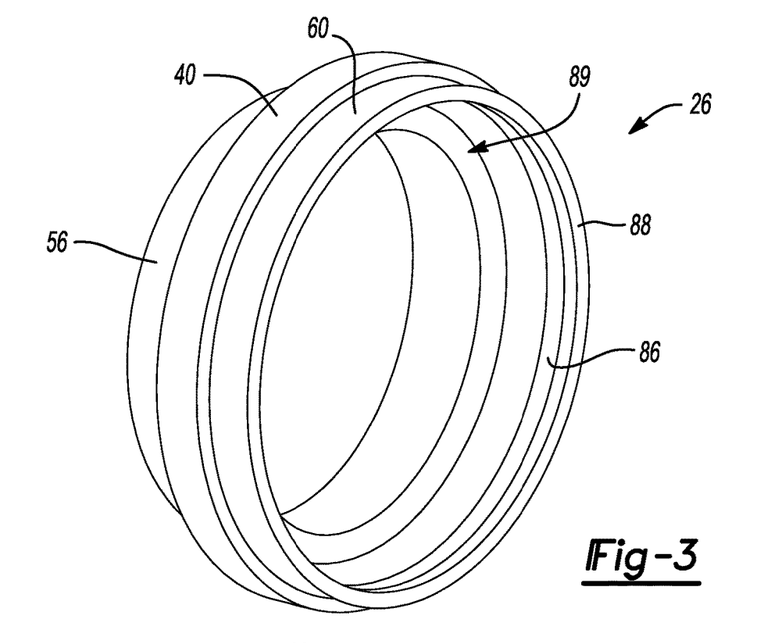
FIG. 3 is a front right perspective view of a clutch sleeve for the ball cam actuated dog clutch of FIG. 1.

Referring to FIG. 4 and again to FIGS. 1 through 3, the clutch hub 32 provides the helical grooves 66, each formed for example by a machining operation, in an outward facing cylindrical wall 90. Each of the ball bearings 58 occupy only a partial depth of the helical grooves 66, with approximately 50% or more of the ball bearings 58 extending out of the helical grooves 66. Each helical groove 66 starts or opens at a first end 92 partially extending through a first end face 94, and extends to the groove end faces 64 which are positioned approximately 50% of a distance between the first end face 94 and an opposite second end face 96. This distance can vary when predetermining the desired axial displacement of the clutch sleeve 26. The plurality of gear teeth 74 are oriented parallel to a longitudinal axis 100 of the clutch hub 32, and therefore extend in an axial direction along the cylindrical wall 90, and start at the second end face 96. An inner race 98 of the clutch hub 32 contacts the bushing 34 shown and described in reference to FIGS. 1 and 2. The longitudinal axis 100 of the clutch hub 32 is co-axially aligned with the longitudinal axis 38 of the transmission 10 in its installed position shown in reference to FIG. 2.

Referring to FIG. 5 and again to FIGS. 1 through 4, in the clutch assembly open position, the gear teeth 54 of the clutch sleeve 26 are positioned clear of and therefore disengaged from the gear teeth 52 of the ring gear extension member 24 of the ring gear 22. No engine torque can be transferred to the differential 18 at this position. The ball bearings 58 are each positioned in direct contact with, or in proximate relationship to the groove end faces 64 of the helical grooves 66. From the open position, to engage the clutch assembly 36, the clutch hub 32 is axially rotated in a direction of rotation "D", which will thereafter axially displace the clutch sleeve 26. The normally open clutch assembly 36 occurs with the drive unit positioned in neutral. This can be done when the vehicle is in park, when the vehicle is shifted into neutral (i.e., for towing), or while the vehicle is driving but when the motor is not needed in order to reduce system losses (i.e., coasting).

Referring to FIG. 6 and again to FIGS. 1 through 5, the clutch closed position shown results following axial rotation of the clutch hub 32 and axial displacement of the clutch sleeve 26 in the direction "B". In the clutch closed position the gear teeth 54 of the clutch sleeve 26 are meshed with the gear teeth 52 of the ring gear extension member 24 of the ring gear 22. The clutch assembly 36 will be closed anytime the transmission 10 has to provide torque. Engine torque can be transferred to the differential 18 at the closed position. The load applied to the clutch assembly 36 is from a torque on the ring gear 22 due to drive torque. The design of the clutch assembly 36 of the present disclosure allows the clutch sleeve 26 to be axially displaced by axial rotation of the clutch hub 32 even under full applied torque loading and at all ambient operating temperatures of the transmission 10.

Referring to FIG. 7 and again to FIGS. 1-6, the geometry of the gear teeth 52 of the ring gear extension member 24 of the ring gear 22 and the geometry of the gear teeth 54 of the clutch sleeve 26 are presented. The gear teeth 52 each include a chisel shaped end 102 with a first angled face 104 and a differently directed second angled face 106. Each of the gear teeth 52 has a common width "E". The gear teeth 54 of the clutch sleeve 26 are similarly shaped, each including a chisel shaped end 108 with a first angled face 110 and a differently directed second angled face 112. Successive ones of the gear teeth 54 are separated by a common sized valley 114, which is sized to permit sliding engagement of one of the gear teeth 54. The chisel shaped ends 102, 108 promote gear meshing.

Referring again to FIGS. 1-7, the ball cam actuated dog clutch assembly 36 for a motor vehicle transmission 10 of the present disclosure includes the clutch sleeve 26 having the plurality of gear teeth 54 positioned at the first end 56 and multiple ball bearings 58 disposed at the second end 60. The clutch hub 32 has gear teeth 74 and multiple helical grooves 66 created in its outer facing wall 90. Each of the helical grooves 66 receives a portion (approximately 50%) of one of the ball bearings 58. The actuator motor 76 rotates the gear 72 that is meshed with the gear teeth 74 of the clutch hub 32 operating to rotate the clutch hub 32. Rotation of the clutch hub 32 causes axial translation of the clutch sleeve 26 in a selected one of the first direction "A" or the opposite second direction "B" by translation of the ball bearings within the helical grooves 66. Operation of the actuator motor 76 in a first rotational direction "F" translates the clutch sleeve 26 in the second direction "B" acting to mesh the plurality of gear teeth 54 of the clutch sleeve 26 with the plurality of gear teeth 52 of the transmission final drive member 16 thereby engaging the dog clutch assembly 36 with the final drive member 16 defining the clutch closed position. Operation of the actuator motor 76 in a second rotational direction "G" translates the clutch sleeve 26 in the first direction "A" acting to disengage the plurality of gear teeth 54 of the clutch sleeve 26 from the plurality of gear teeth 52 of the transmission final drive member 16, thereby defining the clutch open position.

The description of the invention is merely exemplary in nature and variations that do not depart from the gist of the invention are intended to be within the scope of the invention. Such variations are not to be regarded as a departure from the spirit and scope of the invention.

What is claimed is:

1. A ball cam actuated dog clutch assembly for a motor vehicle, comprising:
   a clutch sleeve having multiple ball bearings retained by the clutch sleeve;
   a clutch hub having multiple helical grooves created in an outer facing wall, the clutch hub positioned partially within the clutch sleeve having each of the helical grooves receiving a portion of one of the ball bearings; and
   wherein rotation of the clutch hub causes axial translation of the clutch sleeve in a selected one of a first direction or an opposite second direction by translation of the ball bearings within the helical grooves, and wherein the clutch sleeve includes a plurality of gear teeth positioned at a first end aligned for meshed engagement with gear teeth of a drive assembly and the multiple ball bearings are disposed at a second end.

2. The ball cam actuated dog clutch assembly for a motor vehicle of claim 1, further including a bushing sleeve having a spline.

3. The ball cam actuated dog clutch assembly for a motor vehicle of claim 2, wherein the clutch sleeve further includes a splined face which is slidably connected with the spline of the bushing sleeve, wherein the clutch sleeve is axially slidable in each of the first direction and the second direction along the spline.

4. The ball cam actuated dog clutch assembly for a motor vehicle of claim 3, further including a clip member located at a free end of the spline of the bushing sleeve acting to provide a positive stop for the clutch sleeve.

5. The ball cam actuated dog clutch assembly for a motor vehicle of claim 2, further including a biasing member positioned in contact with each of an end face of the clutch sleeve and a contact face of the bushing sleeve, the biasing member normally biasing the clutch sleeve in the first direction.

6. The ball cam actuated dog clutch assembly for a motor vehicle of claim 2, wherein the clutch hub and the clutch sleeve are coaxially aligned on a longitudinal axis, the rotation of the clutch hub defining an axial rotation with respect to the longitudinal axis and the translation of the clutch sleeve in either of the first or the second directions being parallel to the longitudinal axis.

7. The ball cam actuated dog clutch assembly for a motor vehicle of claim 1, wherein in an open position of the clutch assembly, each of the ball bearings directly contacts a groove end face of the helical grooves formed in a first end of the clutch hub.

8. The ball cam actuated dog clutch assembly for a motor vehicle of claim 1, wherein a length of each of the helical grooves is predetermined and defines a total axial displacement in each of the first direction and the opposite second direction of the clutch sleeve resulting from axial rotation of the clutch hub.

9. The ball cam actuated dog clutch assembly for a motor vehicle of claim 1, wherein the clutch sleeve includes a circumferential slot created in an inner facing wall proximate to an end of the clutch sleeve, the ball bearings positioned partially within the slot and individually retained and spaced by a cage assembly.

10. The ball cam actuated dog clutch assembly for a motor vehicle of claim 9, wherein the slot is positioned proximate to an end face of the end of the clutch sleeve, providing clearance between an inner wall end face of the clutch sleeve and an opposite end of the clutch hub, allowing free sliding motion of the clutch hub within the clutch sleeve.

11. The ball cam actuated dog clutch assembly for a motor vehicle of claim 1,
    wherein the helical grooves are each created in an outward facing cylindrical wall of the clutch hub; and
    wherein each of the ball bearings occupy only a partial depth of the helical grooves, with approximately 50% or more of the ball bearings extending out of the helical grooves.

12. The ball cam actuated dog clutch assembly for a motor vehicle of claim 11, wherein each helical groove starts at a first end of the clutch hub and partially extending through a first end face of the clutch hub, and extends to a groove end face positioned approximately 50% of a distance between the first end face and an opposite second end face of the clutch hub.

13. A ball cam actuated dog clutch assembly for a motor vehicle transmission, comprising:
    a clutch sleeve having a plurality of gear teeth positioned at a first end and multiple ball bearings disposed at a second end;
    a clutch hub having multiple helical grooves created in an outer facing wall, each of the helical grooves receiving a portion of one of the ball bearings; and
    an actuator member acting to rotate the clutch hub, rotation of the clutch hub causing axial translation of the clutch sleeve in a selected one of a first direction or an opposite second direction by translation of the ball bearings within the helical grooves.

14. The ball cam actuated dog clutch assembly for a motor vehicle of claim 13, wherein the gear teeth of the clutch sleeve when meshed with gear teeth of a ring gear extension member of a final drive unit of a transmission defines a clutch assembly closed position.

15. The ball cam actuated dog clutch assembly for a motor vehicle of claim 13, wherein the ball bearings are retained in an axially fixed relationship to the clutch sleeve and are displaced within the helical grooves formed in the clutch hub, axial rotation of the clutch hub with the clutch hub being fixed against displacement in a direction of a longitudinal axis of the dog clutch converts a rotational force of the clutch hub to a force having an axial component parallel to the longitudinal axis acting against the ball bearings, forcing the ball bearings to displace within the helical grooves, thereby axially displacing the clutch sleeve.

16. The ball cam actuated dog clutch assembly for a motor vehicle of claim 13, wherein the actuator member is a DC actuator motor.

17. The ball cam actuated dog clutch assembly for a motor vehicle of claim 16, wherein the actuator motor is connected to a gear, the gear meshed with gear teeth of the clutch hub such that operation of the actuator motor selectively rotates the clutch hub in either the first direction or the second direction.

18. A ball cam actuated dog clutch assembly for a motor vehicle transmission, comprising:
    a clutch sleeve having a plurality of gear teeth positioned at a first end and multiple ball bearings disposed at a second end;

a clutch hub having gear teeth and multiple helical grooves created in an outer facing wall, each of the helical grooves receiving a portion of one of the ball bearings; and an actuator motor rotating a gear meshed with the gear teeth of the clutch hub operating to rotate the clutch hub, rotation of the clutch hub causing axial translation of the clutch sleeve in a selected one of a first direction or an opposite second direction by translation of the ball bearings within the helical grooves;

wherein operation of the actuator motor in a first rotational direction translates the clutch sleeve in the second direction acting to mesh the plurality of gear teeth of the clutch sleeve with a plurality of gear teeth of a transmission final drive member, thereby engaging the dog clutch assembly with the final drive member defining a clutch closed position, and wherein operation of the actuator motor in a second rotational direction translates the clutch sleeve in the first direction acting to disengage the plurality of gear teeth of the clutch sleeve from the plurality of gear teeth of the transmission final drive member, thereby defining a clutch open position.

* * * * *